United States Patent [19]
Ooniwa et al.

[11] Patent Number: 5,389,451
[45] Date of Patent: Feb. 14, 1995

[54] LAMINATED STEEL SHEET FOR WELDED CAN

[75] Inventors: Naoyuki Ooniwa; Hiroyuki Kato; Takaaki Kondo, all of Kawasaki, Japan

[73] Assignee: NKK Corporation, Tokyo, Japan

[21] Appl. No.: 34,136

[22] Filed: Mar. 22, 1993

[30] Foreign Application Priority Data

Mar. 25, 1992 [JP] Japan .................................. 4-067498
Mar. 31, 1992 [JP] Japan .................................. 4-074928

[51] Int. Cl.⁶ .............................................. B32B 15/08
[52] U.S. Cl. .................................... 428/612; 428/623; 428/626; 428/648
[58] Field of Search ............... 428/623, 626, 612, 632, 428/648

[56] References Cited

U.S. PATENT DOCUMENTS 4,614,691 9/1986 Inui et al. ............... 428/623
4,783,378 11/1988 Wakui et al. ........... 428/600

FOREIGN PATENT DOCUMENTS 0312308 4/1989 European Pat. Off. .
0493119 1/1992 European Pat. Off. .
3934904 5/1991 Germany .
3-236954 10/1991 Japan .

OTHER PUBLICATIONS

Derwent Publications Ltd., London, GB; AN 91-351209 (48) of JP-A-3 236 954 (Nippon Steel Corp.) 22 Oct. 1991.
Derwent Publications Ltd., London, GB; AN 86-314835 (48) of JP-A-61 232 148 (Hokkai Seikan KK) 16 Oct. 1986.
Derwent Publications Ltd., London, GB; AN 89-266607 (37) of JP-A-1 192 545 (Nippon Steel Corp.) 2 Aug. 1989.

Primary Examiner—John Zimmerman
Attorney, Agent, or Firm—Frishauf, Holtz, Goodman & Woodward

[57] ABSTRACT

A laminated steel sheet for a welded can which includes: a steel sheet; a plating layer formed on the steel sheet, the plating layer having a surface roughness represented by a PPI of 5 to 150, the plating layer having a tinning layer and a chemical treatment layer, the tinning layer being formed on the steel sheet and the chemical treatment layer being formed on the tinning layer, the tinning layer having a coating weight of 0.9 to 2.8 g/m$^2$, the chemical treatment layer containing 5 to 50 mg/m$^2$ of metallic chromium and hydrated chromium oxide containing 5 to 25 mg/m$^2$ of chromium; and a resin film thermo-compressed on the plating layer in a band form, the resin film being a biaxially oriented film of a polyethylene terephthalate copolymer, the polyethylene terephthalate copolymer having an acid component of which 0.5 to 10 mol % is isophthalic acid.

20 Claims, 5 Drawing Sheets

LAMINATED STEEL SHEET FOR WELDED CAN

BACKGROUND OF THE INVENTION

1. Field of the Invention

Present invention relates to a steel sheet to which resins are laminated in advance and which is used for a food can or the like and, more particularly, a laminated steel sheet suitable to welding.

2. Description of the Related Art

There are several methods of manufacturing cans: a soldered can making method, a welded can making method, a cemented can making method, a draw and ironing can making method, a draw and redrawing can making method, etc. The welded can making method uses simpler equipment at a lower cost than any other methods and can be carried out by easy and reliable operation. The cans made by this method have welded portions with high strength, so that they withstand severe working. For these reasons, the welded can making method has rapidly into wide use.

As the material for cans used in the soldered can making method and welded can making method, tinned steel sheets were initially used. Because a welded can has less coating weight than a soldered can, the wide use of the welded can making method is anticipated.

The sidewall and top end of food cans have been painted. The painting consists of thick-film painting for enhancing corrosion resistance of the inner surface of the can, painting for protecting the outer surface, printing, and the like. When the painting or the printing is performed, a steel sheet is cut to a predetermined size before being painted or printed. The process of the cutting and painting or printing requires a physical distribution cost as well as measures against environmental pollution due to painting. Therefore, the process has involved problems to be solved in can making.

So far, a laminated steel strip on which a film is laminated in a band form except for a welded portion has been proposed for welded cans. For instance, JP-A-H3-236954 (the term "JP-A-" referred to herein simplifies "unexamined Japanese Patent Publication") proposes a material for cans on which a thermoplastic film is laminated over a width corresponding to the height of a can except for a non-laminated portion 2 to 5 mm wide. The disclosed resins for the thermoplastic film are polyester, polypropylene, polyethylene, and nylon.

For the proposed material for cans mentioned above, however, consideration is not given to the fact that the adhesive force between the resin film and the base material is decreased by a thermal effect caused during a welding, touch-up painting of welded portion, or retorting. The resin film is blistered or separated by retorting.

SUMMARY OF THE INVENTION

An object of present invention is to provide a laminated steel sheet for a welded can in which the thermal effect during welding is reduced and the adhesive force is not decreased even when a thermal effect is given.

To achieve the above object, the present invention provides a first laminated steel sheet for a welded can comprising:

a steel sheet;
a plating layer formed on the steel sheets, said plating layer having a surface roughness represented by a PPI of 5 or more than 150 or less, wherein PPI is the number of peak per inch exceeding 0.5 $\mu$m appearing in the cross section of the plating film surface;
said plating layer having a tinning layer and a chemical treatment layer; said tinning layer being formed on the steel sheet and said chemical treatment layer being formed on the tinning layer;
said tinning layer having a coating weight of 0.9 $g/m^2$ or more and 2.8 $g/m^2$ or less;
said chemical treatment layer containing metallic chromium of 5 $mg/m^2$ or more and 50 $mg/m^2$ or less and hydrated chromium oxide containing chromium of 5 $mg/m^2$ or more and 25 $mg/m^2$ or less;
a resin film bonded by thermo-compression on the plating layer in a band form; and
said resin film being a biaxially oriented film of polyethylene terephthalate copolymer, said polyethylene terephthalate copolymer having acid component of which 0.5 mol % or more than 10 mol % or less is isophthalic acid.

In place of the resin film described above, a resin film having upper layer and lower layer films may be used. The upper layer film is a biaxially oriented film of polyethylene terephthalate homopolymer. The lower layer film is a biaxially oriented film of polyethylene terephthalate copolymer having acid component of 0.5 mol % or more than 10 mol % or less is isophthalic acid.

Further, the present invention provides a second laminated steel sheet for a welded can, comprising:

a steel sheet;
a plating layer formed on the steel sheet;
said plating layer having a tinning layer and a chemical treatment layer, said tinning layer being formed on the steel sheet and said chemical treatment layer being formed on the tinning layer;
said tinning layer having a coating weight of 0.9 $g/m^2$ or more and 2.8 $g/m^2$ or less;
said chemical treatment layer containing metallic chromium of 5 $mg/m^2$ or more and 50 $mg/m^2$ or less and hydrated chromium oxide containing chromium of 5 $mg/m^2$ or more and 25 $mg/m^2$ or less;
an adhesive layer formed on the plating layer in a band form;
said adhesive layer being formed by heating and curing an adhesive including a resol type phenolic resin containing 70–90 wt. % bisphenol A epoxy resin and the balance of bisphenol A resin, and the bisphenol A epoxy resin having a number average molecular weight of 15,000–30,000;
a resin film bonded on the plating film via said adhesive layer; and
said resin film being a biaxially oriented film of polyethylene terephthalate homopolymer.

Further, the present invention provides a third laminated steel sheet for a welded can, comprising:

a steel sheet;
a plating layer formed on the steel sheet, said plating film having a surface roughness represented by PPI of 5 or more and 150 or less, wherein PPI is the number of peak per inch exceeding 0.5 $\mu$m appearing in the cross section of the plating layer surface;
said plating layer having a lower nickel plating layer and an upper tinning layer and a chemical treatment layer, said nickel plating layer being formed on the steel sheet, said tinning layer being formed on the nickel plating layer, and said chemical treatment layer being formed on the nickel plating layer, and said chemical treatment layer being formed on the tinning layer;

said nickel plating layer having a coating weight of 15 g/m² or more and 100 g/m² or less;

said tinning layer having a coating weight of 0.6 g/m² or more and 2.0 g/m² or less;

said chemical treatment layer containing metallic chromium of 5 mg/m² or more and 50 mg/m² or less and hydrated chromium oxide containing chromium of 5 mg/m² or more and 25 mg/m² or less;

a resin film bonded by thermo-compression on the plating layer in a band form; and said resin film being a biaxially oriented film of polyethylene terephthalate copolymer, said polyethylene terephthalate copolymer having acid component of which 0.5 mol % or more and 10 mol % or less is isophthalic acid.

In place of the resin film described above, a resin film having upper layer and lower layer films may be used. The upper layer film is a biaxially oriented film of polyethylene terephthalate. The lower layer film is a biaxially oriented film of polyethylene terephthalate copolymer having acid component of 0.5 mol % or more and 10 mol % or less is isophthalic acid.

Still further, the present invention provides a fourth laminated steel sheet for a welded can, comprising:

a steel sheet;

a plating layer formed on the steel sheet, said plating layer having a lower nickel plating layer and an upper tinning layer and a chemical treatment layer; said nickel plating layer being formed on the steel sheet, said tinning layer being formed on the nickel plating layer and said chemical treatment layer being formed on the tinning layer;

said nickel plating layer having a coating weight of 15 g/m² or more and 100 g/m² or less;

said tinning layer having a coating weight of 0.6 g/m² or more nad 2.0 g/m² or less;

said chemical treatment layer containing metallic chromium of 5 mg/m² or more and 50 mg/m² or less and hydrated chromium oxide containing chromium of 5 mg/m² or more and 25 mg/m² or less;

an adhesive layer formed on the plating layer in a band form;

said adhesive layer being formed by heating and curing an adhesive including a resol type phenolic resin containing 70-90 wt. % bisphenol A epoxy resin and the balance of bisphenol A resin, and the bisphenol A epoxy resin having a number average molecular weight of 15,000–30,000, a resin film bonded on the plating layer via said adhesive layer, and said resin film being a biaxially oriented film of polyethylene terephthalate.

DESCRIPTION OF THE PREFERRED EMBODIMENT

Figure 1:
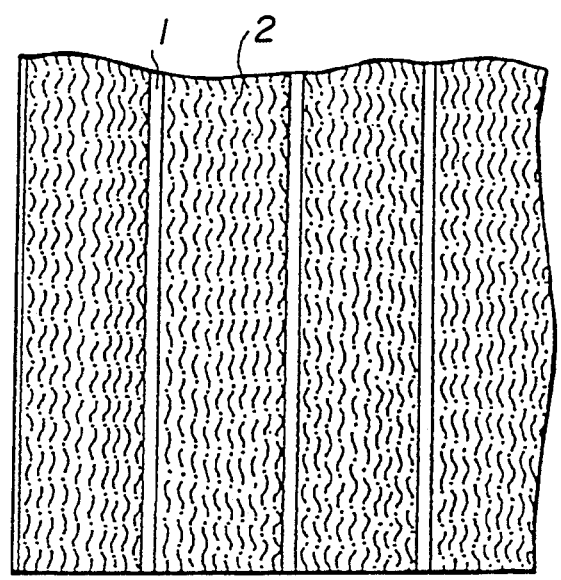
FIG. 1 is a plan view showing a surface of a laminated steel sheet in accordance with the present invention.
Figure 2:
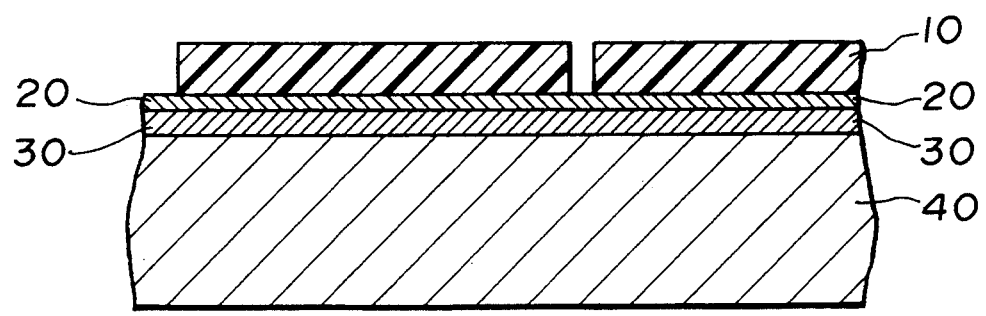
FIG. 2 is a sectional view of a laminated steel sheet in accordance with the present invention.

The surface of laminated steel sheet has an area where a resin film is a laminated and an area where the resin film is not laminated for welding. The area where the resin film is not laminated is subjected to chemical treatment so that paint sticks firmly on a tinning layer. FIG. 1 is a plan view showing a surface of a laminated steel sheet. The area 1 where the resin film is not laminated and the area 2 where the resin film is laminated are alternately arranged in parallel to the rolling direction of steel sheet. FIG. 2 is a sectional view of a laminated steel sheet. Reference number 10 denotes a resin film, 20 denotes a chemical treatment layer, 30 denotes a plating layer, and 40 denotes a steel sheet. The area 1 where resin film is not laminated comprises a plating layer 30 formed on a steel sheet 40 and a chemical treatment layer 20, and is not coated with a resin film. The area 1 where the resin film is not laminated is welded. Though the resin film is laminated on the steel sheet in advance, there is no need for removing the resin film when welding is performed during the can making process.

The area 2 where the resin film is laminated, like the area 1 where the resin films not laminated, is subjected to chemical treatment to form a chemical treatment layer 20 on the plating layer, and resin is laminated on the chemical treatment layer 20. Since resin is laminated, there is no need for troublesome painting during the can making process. The width of the laminated film is determined depending on the diameter of can. For instance, the width is 161 mm for a 200 ml drink can.

The area 1 where the resin film is not laminated is needed on both faces of the steel sheet because welding is performed with the outside and inside faces being in contact with each other. The area 2 where the resin film is laminated may be disposed at least on the face constituting the inner surface of can. Needless to say, the area 2 may be disposed on both surfaces. When the area 2 is disposed on both surfaces of the can, treatment is carried out considering the inner and outer surfaces of the can. For instance, the face corresponding to the inner surface of the can is provided with the area on which the resin film is laminated in accordance with the present invention, while the face corresponding to the outer surface of the can is provided with a plating layer only, a painting film, a white coat resin laminate, or a printed resin laminate. That is to say, the outer face is treated depending on the requirement.

On at least one face of the steel sheet which constitutes the inner surface of the can after the can is made, the resin is laminated in advance. The inner surface of the can must not be damaged or deteriorated after the processes of welding, outside printing, working and the like. The film on the inner surface of the can must have corrosion resistance and adhesion when and after the contents are put in the can.

When welding is performed, the width of the area 1 where the resin film is not laminated is important. The temperature of the weld exceeds 1000° C. and the heat of the weld propagates in the circumferential direction of the can. The adhesion and other properties of the resin film must not be impaired by the effect of this heat. If the width of the area 1 where resin film is not laminated is too narrow, the resin may be melted or deteriorated, resulting in a reduction in adhesion, workability, and corrosion resistance. Although the heat propagation area depends on the welding speed, sheet thickness, heat conductivity, and so on, welding speed has particularly a great effect. The width of the weld required for avoiding the effect of the heat during welding heat differs depending on the welding method. At present, an electric resistance narrow lap seam welding method is used most often. With this method, the width of the weld should be 5 mm or more for conservation. If a high-speed welding method using high density energy is employed, the width of the weld may be narrowed. A width of the weld is necessary to be about 0.5 mm is needed because the thickness of steel sheet for cans is about 0.2 mm. When the area 1 where the resin film is not laminated lies at the edge of the steel sheet, the width may be halved.

Between the resin film and the surface of the plated steel sheet, there must be an adhesive force to withstand necking and the like. When heat due to welding or outside printing is applied, the resin film tends to shrink. At this time, if air or moisture is trapped between the resin film and the surface of the plated steel sheet, no sufficient adhesive force is provided. If there is a portion where the adhesive force is weakened, separation occurs in necking, flanging, or seaming. If there are irregularities on the surface of the plated steel sheet, it is difficult for softened resin film to enter into the bottom of the concave during laminating, so that air and moisture are prone to be trapped. To prevent the trapping of air and moisture, the irregularities on the surface of plated steel sheet should be less, and the resin film should have fluidity when being thermo-compressed.

Figure 3A:
FIG. 3(A) and FIG. 3(B) are views schematically showing conditions in which a resin film is laminated on a plated steel sheet.
Figure 3B:
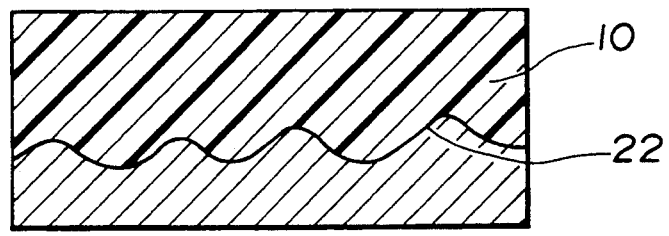

If the surface roughness PPI of the plated steel sheet, represented with the threshold value being 0.5 $\mu$m, is 150 or less, less air and moisture are trapped, so that sufficient adhesion is provided when the resin film is laminated. The surface roughness PPI is the number of peak per inch exceeding the threshold value appearing in the cross-section of the surface. The less PPI is, the less air and moisture are trapped. In FIG. 3(A), the resin film is laminated on a plated steel sheet with a surface roughness PPI of about 500. In FIG. 3(B), the resin film is laminated on a plated steel sheet with a surface roughness PPI of about 50. When the surface roughness PPI is high as shown in FIG. 3(A), spaces 24 exist between the resin film 10 and the surface 22 of plated steel sheet. When the surface roughness PPI is low as shown in FIG. 3(B), there is no space 24 between the resin film 10 and the surface 22 of plated steel sheet.

If the PPI is too low, however, scratches are prone to develop on the surface of steel sheet during handling for printing, handling and the like. Therefore, the surface roughness PPI of the plated steel sheet is preferably 5 or more and 150 or less. More preferably, the surface roughness PPI should be 5 or more and 100 or less.

To decrease the roughness of the plated surface, it is effective to decrease the roughness of the base steel sheet. In order to obtain a surface of a plated steel sheet with a surface roughness PPI of 150 or less, a steel sheet with a surface roughness PPI of 180 or less should be used.

The use of a resin film on which cracks are formed during working must be avoided. Also, a resin film which flows into all the corners of concaves on the surface of plated steel sheet during thermo-compression must be used. Hereinafter, the property for a resin film to flow into all corners of concaves on the surface of plated steel sheet during thermo-compression is called "heat sealable property". Resins having such a property include polyolefin, polyester, nylon and the like. However, since the resin film is exposed to overheated steam exceeding 100° C. during retorting, polyolefin and nylon, which have a relatively low melting point and are unstable at high temperatures, have a problem in terms of retorting. Among polyester resins, those having high heat resistance are polyethylene terephthalate and polyethylene naphthalate. In particular, resins of a polyethylene terephthalate base have high corrosion resistance as well as flexibility to withstand severe working. Among these materials, a biaxially oriented film of polyethylene terephthalate base resin has an excellent property to shut off corrosive substances. However, a homopolymer using 100% terephthalic acid as the acid component, though being a polyethylene terephthalate base, has a melting point exceeding 260° C., so that sufficient fluidity cannot be obtained during thermo-compression. This is because the thermo-compression temperature is limited to 230° C. to prevent alloying of tin in the plating layer.

It is well known that the melting point is lowered by changing the acid component in polyethylene terephthalite base polymer. However, the object is not achieved unless the melting point is lowered without losing the features of high heat resistance, corrosion resistance, and the like which a homopolymer has. The inventors made extensive studies on the acid component, and found that the above object is achieved by replacing a part of terephthalic acid with isophthalic acid. It is thought that the replacement with isophthalic acid reduces the crystallization of resin during film forming to lower the melting point.

When terephthalic acid is replaced with isophthalic acid, the remarkable effect of improvement in heat sealable property cannot be obtained unless the content of isophthalic acid is 0.5 mol % or more of acid component. If the content of isophthalic acid is too high, the resin film shrinks when being heated during can making process. If thermal shrinkage occurs, stress is accumulated in the resin film, so that the adhesion to the surface of the plated steel sheet is easily deteriorated during working. Therefore, the content exceeding 10 mol % of acid component should be avoided. That is to say, a biaxially oriented film whose main component is polyethylene terephthalate and whose acid component of 0.5 mol % or more and 10 mmol % or less is isophthalic acid has a high heat sealable property and prevents the decrease in adhesion during can making process. The content of isophthalic acid of 1.0 mol % or more and 8.0 mol % or less is more preferable.

Figure 4:
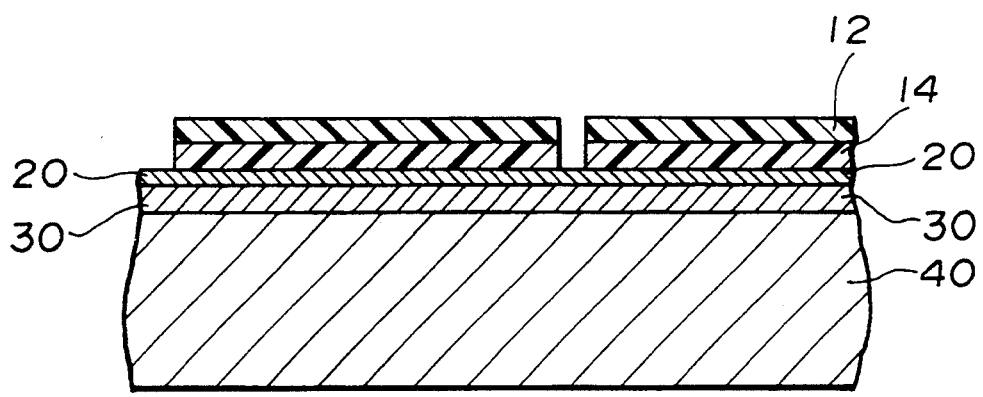
FIG. 4 is a sectional view of a laminated steel sheet with two layers of resin film in accordance with the present invention.

As described above, polyethylene terephthalate homopolymer is not subjected to shrinkage resulting from heating and has a high shut-off property, while polyethylene terephthalate copolymer containing isophthalic acid has a high heat sealable property. If a two-layer film structure is used, therefore, the advantages of polyethylene terephthalate homopolymer and polyethylene terephthalate copolymer can be fully utilized. A laminate layer which has minimized thermal shrinkage, high heat sealable property, and a great shut-off effect can be obtained. FIG. 4 is a sectional view of a laminated steel sheet having two layers of a resin film. The film of copolymer whose acid component of 0.5 mol % or more and 10 mol % or less is isophthalic acid constitutes a lower layer 14, while the film of polyethylene terephthalate homopolymer constitutes an upper layer 12. Such a two-layer film structure is advantageous in respect to cost compared to the film in which the entire film is composed of copolymer. The thickness of the copolymer, the lower layer, must be at least over the threshold value of surface roughness of the plated surface, i.e. 0.5 $\mu$m; it is preferably not less than 1 $\mu$m.

Figure 5:
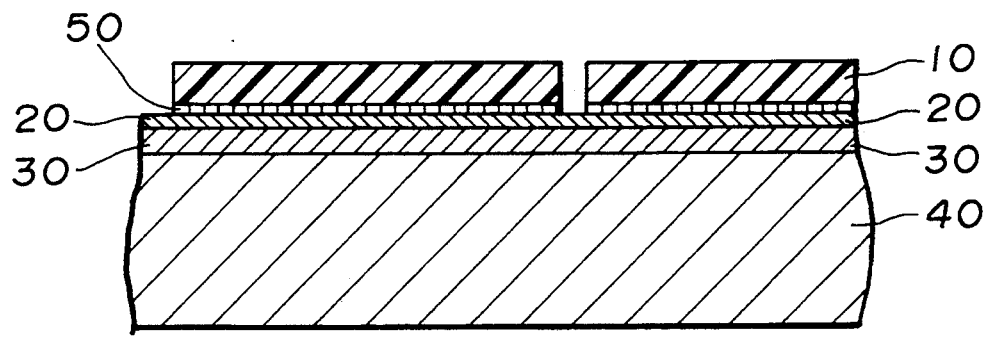
FIG. 5 is a sectional view of a laminated steel sheet to which a resin film is bonded with an adhesive in accordance with the present invention.

Another method for overcoming the disadvantage of poor thermal adhesion property of polyethylene terephthalate homopolymer is to use an adhesive. FIG. 5 is a sectional view of a laminated steel sheet with a resin film being bonded by means of an adhesive. The resin film 10 is bonded to the chemical treatment layer 20 via an adhesive layer 50 formed by an adhesive.

The adhesive requires sufficient adhesion property and heat resistance. When laminated steel sheets are continuously manufactured, the adhesive must be cured enough in a short time. If a can is manufactured with the adhesive being cured insufficiently, the adhesion of resin film is decreased or the resin film is clouded white, what we call "whitening" occurs, during retorting.

Epoxy resins are often used as an adhesive. Among them, bisphenol A epoxy resin is chemically stable and has high heat resistance. However, this resin takes too much time for curing and becomes too hard to maintain the workability of an adhesive layer depending on the molecular weight of the adhesive resin. The inventors studied in detail the relationship between these phenomena and the resin, and found that there is a resin which overcomes the drawbacks of epoxy resin and the epoxy resin has the optimum range of molecular weight.

To finish curing in a short time, an appropriate amount of resol type phenol resin whose base is bisphenol A should be mixed. The resol type phenol resin was selected in consideration of a property that its addition accelerates curing of adhesive, and enhances heat resistance, and workability. Hereinafter, the property that an adhesive cures in a short time is called a short-curing-time property. The resol type phenol resin reacts with an unreacted functional group during heating for bonding and crosslinks epoxy, thereby the curing time being shortened.

Figure 6:
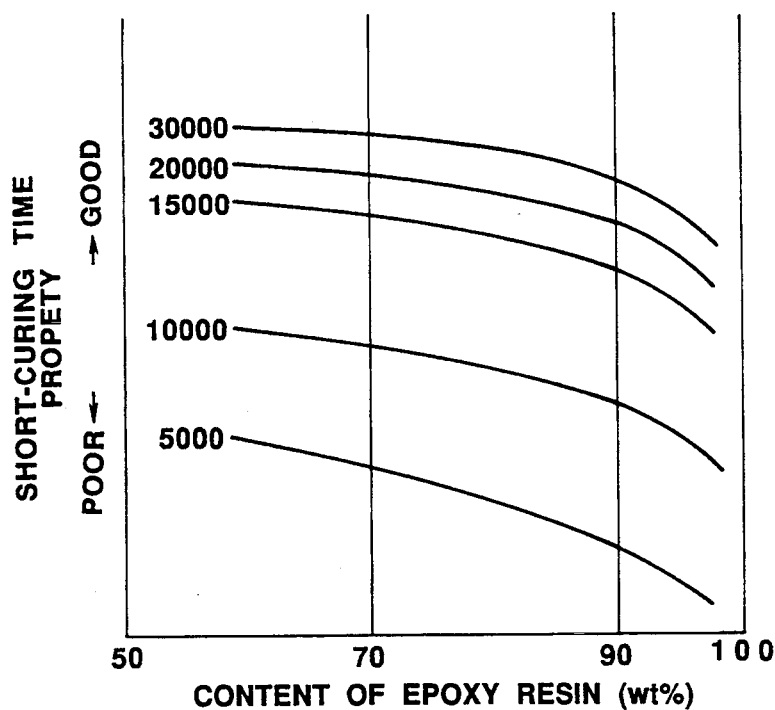
FIG. 6 is a graph showing the relationship between the content of epoxy resin and the short-curing-time property during bonding.

The short-curing-time property relates also to the molecular weight of the epoxy resin itself; a resin having a higher molecular weight cures in a shorter time. FIG. 6 shows the relationship between the short-curing-time property and the content of the epoxy resin in adhesive with the number average molecular weight of the epoxy resin. In FIG. 6, the ordinate represents the short-curing-time property and the abscissa the content of the epoxy resin in adhesive. In the adhesive, a resol type phenol resin is used except for epoxy resin. In this study, number average molecular weights of epoxy resin of about 5,000, 10,000, 15,000, 20,000 and 30,000 were chosen. As the content of epoxy resin increases, the short-curing-time property becomes poor. When the content of epoxy resin exceeds 90 wt. %, the short-curing-time property decreases significantly. The decrease in short-curing-time property leads to whitening during retorting. The higher the number average molecular weight of epoxy resin is, the better the short-curing-time property is. This phenomenon is particularly obvious when the number average molecular weight of the epoxy resin is over 15,000.

However, the adhesion property of adhesive depends mainly on the content of the epoxy resin. If the content of the epoxy resin is less than 70 wt. %, required adhesion is sometimes not obtained during working. Also, the molecular weight of the epoxy resin has an upper limit. If the molecular weight is too high, the adhesive film becomes hard after being heated for curing. If the number average molecular weight exceeds 30,000, there is a possibility of cracks occurring during working.

The adhesive consists of bisphenol A epoxy resin containing resol type phenol resin whose base is bisphenol A. The content of bisphenol A epoxy resin is 70 wt. % or more and 90 wt. % or less, and its number average molecular weight is 15,000 or more and 30,000 or less. The use of such an adhesive provides strong adhesion to the surface of a plated steel sheet by short-time heating even when the resin film is polyethylene terephthalate, and prevents defects such as cracking, separation, or whitening of film resulting from heating, working or retorting during can making process.

An appropriate amount of adhesive applied differs depending on the surface roughness of plated steel sheet. An amount of adhesive for correcting the irregularities of surface is required to prevent air and moisture from being trapped between the plated steel sheet and the resin film. If the surface roughness is large, an appropriate amount of adhesive becomes larger. The chromate-treated tinned steel sheet or nickel/tin plated steel sheet has a surface roughness PPI of about 20 to 200. On such a plated steel sheet, a proper amount of adhesive is about 2 mg/dm$^2$ to 50 mg/dm$^2$. The resin film laminated by adhesive is not limited to polyethylene terephthalate. The polyethylene terephthalate copolymer containing isophtalic an acid of 10 mol % or less as acid component can be used. Treatment of corona discharge can be used together with laminating.

The reason for plating is to provide high corrosion resistance to a steel sheet. If only a resin layer is used, it is difficult to completely prevent the penetration of ions completely. If serious corrosion does not occur, the eluate of a small amount of iron may change the taste or smell of contents in food cans. The presence of plating layer maintains the corrosion preventive effect even if small defects occur on the organic resin layer such as resin film and touch-up paint film at the weld during the retort treatment in which the steel sheet is exposed to a high temperature. If a coating weight of tinning of single layer is 0.9 g/m$^2$ or more, the change of taste and smell can be prevented together with the painting film for both the portion with laminate resin film and the portion without resin film, and the retorting resistant property is remarkably improved. The coating weight of tinning exceeding 2.8 g/m$^2$ provides excessive quality.

Figure 7:
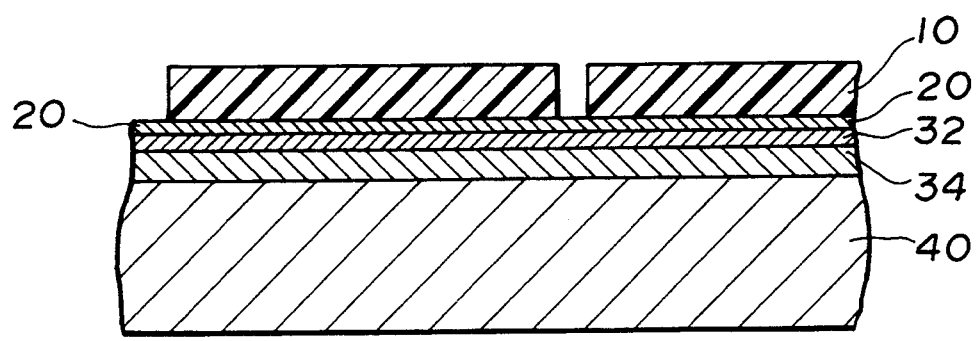
FIG. 7 is a sectional view of a laminated steel sheet having two plating layers of nickel plating layer and tinning layer in accordance with the present invention.

When a steel sheet is nickel plated, tinning is performed on the nickel plated layer. FIG. 7 is a sectional view of a laminated steel sheet having two plating layers: a nickel plating layer and a tinning layer. A nickel plating layer 34 is formed on a steel sheet, and a tinning layer 32 is formed on the nickel plating layer 34. The reason for nickel plating is to maintain corrosion resistance and to facilitate high-speed welding at the portion without resin film. Tin is a soft metal having a low melting point, so that a large area contacting with the electrode can easily be obtained by the softening of tin during seam welding. Therefore, electric current required for welding flows uniformly, at a relatively low voltage, so that a reliable welding surface can be obtained. If excess amount of current flows locally during seam welding, a splash occurs, that is, part of metal splashes. As a result, the weld is contaminated, or the portions where the current is insufficient are joined poorly. This phenomenon is more pronounced as the welding speed is higher. If tinning is performed on a thin nickel plating layer, the effect of tinning is noticed even if the amount of tin is small. The coating weight of tin of 0.6 g/m$^2$ or more sufficiently withstands high-speed welding. The amount of tin of 2.0 g/m$^2$ is enough. The amount exceeding this value does not improve the quality further to be disadvantageous economically.

Nickel is, like tin, a harmless metal and highly corrosion resistant. If a nickel layer is interposed between a tin layer and a steel sheet, the formation of tin-iron alloy is prevented. When two plating layers of nickel and tin are formed, the coating weight of tin can be decreased by plating nickel of 15 mg/m$^2$ or more as a lower layer. The coating weight of tin exceeding 100 mg/m$^2$ is not necessary.

These plating layers, meeting the requirements of both corrosion resistance and weldability, can be used for the inner surface or outer surface of cans. Both surfaces of two plating layers may be tinned, may be formed of nickel and tin; or one surface may be tinned and the other surface may be plated by nickel and tin. For these plating layers, the plating metal may be distributed in a particle form or island form as long as the range of surface roughness of the plated steel sheet of present invention is maintained.

During the can making process, the sidewall of the can is bent round, and then seam welding is performed and touch-up painting is carried out. Then, working, which is called necking, is performed. Specifically, the upper portion of the sidewall of can is drawn to form a neck portion. Further, the opening is subjected to flanging to install a top end cover. In such working, if the adhesion is poor, though the heat sealable property is high, the resin film or painting film is separated.

The reason for performing chemical treatment after plating is to form a chromate film to enhance the adhesion between the surface of plated steel sheet and the resin film or painting film. The chemical treatment film comprises a hydroxide or oxide of chromium and metallic chromium. The hydroxide and oxide of chromium is called hydrated chromium oxide. When the amount of metallic chromium is 5 mg/m$^2$ or more and hydrated chromium oxide containing chromium of 5 mg/m$^2$ or more is formed, more stronger adhesion can be obtained. Even if the amount of metallic chromium exceeds 50 mg/m$^2$, or the amount of chromium in hydrated chromium oxide exceeds 25 mg/m$^2$, the adhesion is not affected. On the contrary, if the amount of chromium in hydrated chromium oxide exceeds 25 mg/m$^2$, brown color becomes deep, which is undesirable as the base for printing.

Figure 8:
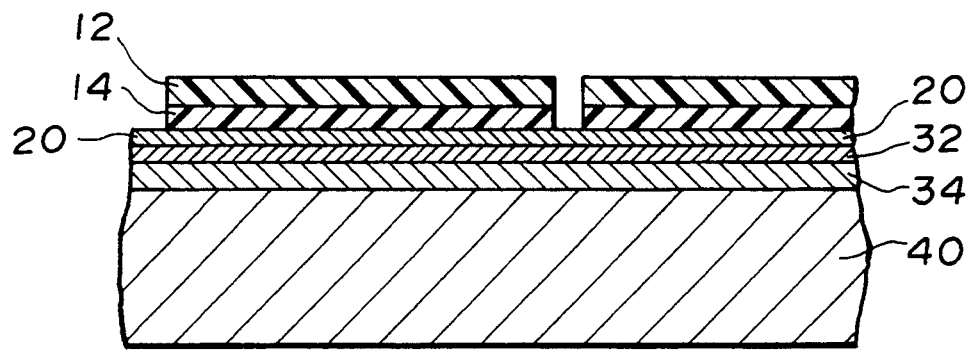
FIG. 8 is a sectional view of a laminated steel sheet having two plating layers of nickel plating layer and tinning layer and two resin film layers in accordance with the present invention.

FIG. 8 is a sectional view of a laminated steel sheet having two plating layers of nickel and tin and two layers of resin film.

Figure 9:
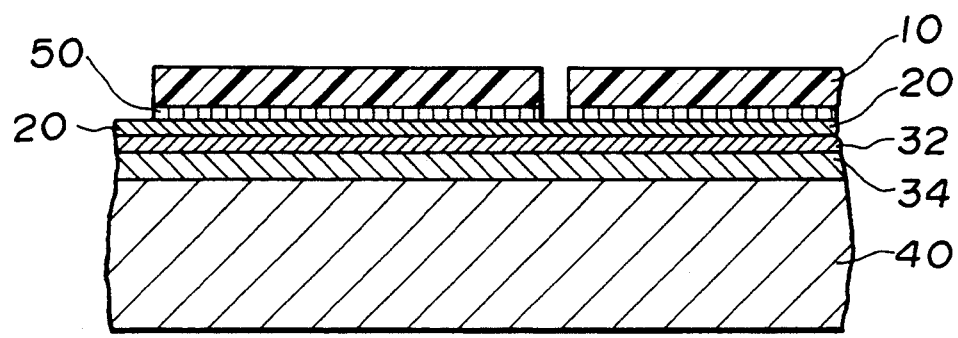
FIG. 9 is a sectional view of a laminated steel sheet having two plating layers of nickel plating layer and tinning layer and a resin film layer bonded via an adhesive layer in accordance with the present invention.

FIG. 9 is a sectional view of a laminated steel sheet having two plating layers of nickel and tin and a resin film layer bonded via an adhesive layer.

In FIG. 7, FIG. 8 and FIG. 9, each layer of a nickel plating layer, a tinning layer and a chemical treatment layer has preferrable thicknesses as follows. The tinning layer is much thicker than nickel plating layer. The nickel plating layer is thicker than the chemical treatment layer.

EXAMPLE 1

A cold-rolled steel sheet of 0.20 mm thick and 842 mm wide was cleaned by degreasing and pickling, and then plated on both surfaces and subjected to chemical treatment. In tinning, a reflow treatment was first performed, and then a chemical treatment was carried out. The treated steel sheet was preheated to 180°–230° C. using an induction heater. After the resin film was bonded continuously while being pressed by a roll, postheating was performed, and then the laminated steel sheet was obtained by cooling. On the obtained laminated steel sheet, weldability, heat sealable property of laminate film, shrink characteristics, adhesive property after forming, and adhesive property after retorting were investigated.

Tinning was performed using a ferrostannate bath, and nickel plating was performed using a watt bath.

Chemical treatment was performed using a chromic anhydride bath containing sodium sulfate. In laminating, a resin film of 161 mm wide and 10–50 μm thick was continuously pressed while installing an area where resin film is not laminated, and then postheated at 205°–225° C. for 5 seconds to 10 minutes, and afterward water cooled.

The resin film was a single-layer film of polyethylene terephthalate copolymer containing isophthalic acid (test No. 1–10) and a two-layer film having the copolymer above described of lower layer and polyethylene terephthalate of upper layer (test No. 11, 17). The thickness of the lower layer was 4 μm and that of the upper layer was 25 μm.

The tests and evaluation were performed as follows.

Weldability: The sidewall of 200 ml can was welded at a welding speed of 40 mpm using a sudronic welding machine, and the occurrence of splash was evaluated.

Heat sealable property: Immediately after laminating, 180° peeling was performed. In the test result, no separation until the resin film is torn was marked with O, separation over 200 g/cm with Δ, and separation under 200 g/cm with X.

Shrink characteristics: Immediately after laminating, the steel sheet was subjected to blanking, heated at 210° C. for 30 seconds, and cooled rapidly. The shrinkage percentage was determined from the difference of resin film width before and after heating.

Adhesive property after forming: After the sidewall of can was welded with the laminate film facing inside, a test piece was cut out of the sidewall of can in the vicinity of the weld. A grid of 2 mm intervals was engraved on the film surface of the test piece. After the test piece was extruded to an Erichsen value of 4 mm, the laminate film was forcedly separated with an adhesive tape, and evaluation was performed on the basis of the percentage of separated area. In the test result, separated area less than 10% was marked with O, separated area of 10% or more and less than 30% with Δ, and separated area of 30% or more with X.

Adhesive property after retorting: After the sidewall of can was welded with the laminate film facing inside, a test piece was cut out of the sidewall of can in the vicinity of the weld. A cross cut was engraved on the film surface of the test piece. After the test piece was extruded to an Erichsen value of 4 mm, the laminate film was forcedly separated with an adhesive tape after the test piece was immersed in a solution containing 1.5% NaCl at 125° C. for 30 minutes. After that, the condition of separation was evaluated. In the test result, no separation was marked with O, slight separation around the cross cut with Δ, and separation on the almost entire surface with X.

The investigation of the characteristics was also performed on comparison to compare with the examples of present invention.

The detailed conditions of test piece used for the investigation and the test results are given in Table 1(A) and Table 1(B), respectively. In table 1(A) and table 1(B), unit of coating weight of tin is $g/m^2$, units of coating weight of nickel, hydrated chromium oxide and metallic chromium are $mg/m^2$.

In the examples of test No. 1 through 11, satisfactory results were obtained in all tests.

Test No. 13: Because of small amounts of metallic chromium in chemical treatment, adhesive properties after forming and retorting were low.

Test No. 14: Because of great surface roughness of plated steel sheet, adhesive properties after forming and retorting were low. A blister was also found on the film.

Test No. 15: Because of low content of isophthalic acid in acid component, the heat sealable property was lowered, thus adhesive properties after forming and retorting were low.

Test No. 16: Because of high content of isophthalic acid in acid component, the shrinkage percentage of resin film was high, thus adhesive property in retorting was low.

Test No. 17: Because of low content of isophthalic acid in the lower layer, the thermal adhesion property was lowered, thus adhesive properties in working and retorting were low.

Test No. 18: Because of rough surface of plating layer, adhesive properties after forming and retorting were low.

Test No. 19: Because of improper resin film, the resin film was softened and separated by the heat during retorting.

Test No. 20: Because of the improper resin film, the resin film was softened and separated during retorting.

TABLE 1(A)

| Test No. | Coating weight Tin | Coating weight Nickel | Chemical treatment layer Hydrated chromium oxide | Chemical treatment layer Metallic Cr | Chemical treatment layer Surface roughness | Content (%) of isophthalic acid or other resin |
|---|---|---|---|---|---|---|
| Example of present invention | | | | | | |
| 1 | 0.9 | — | 13 | 10 | 150 | 5.2 |
| 2 | 1.5 | — | 16 | 15 | 75 | 1.2 |
| 3 | 1.8 | — | 10 | 20 | 43 | 0.5 |
| 4 | 2.0 | — | 20 | 40 | 12 | 2.0 |
| 5 | 1.3 | — | 5 | 5 | 82 | 9.0 |
| 6 | 1.0 | 15 | 15 | 10 | 112 | 0.5 |
| 7 | 1.5 | 60 | 5 | 5 | 51 | 2.2 |
| 8 | 1.3 | 45 | 10 | 20 | 67 | 1.2 |
| 9 | 1.9 | 90 | 18 | 17 | 33 | 3.5 |
| 10 | 0.6 | 35 | 20 | 10 | 40 | 8.5 |
| 11 | 1.0 | 20 | 15 | 10 | 50 | upper layer 0.0 lower layer 8.0 |
| Comparison | | | | | | |
| 12 | 0.7 | — | 15 | 12 | 45 | 1.5 |
| 13 | 1.6 | — | 12 | 3 | 53 | 1.2 |
| 14 | 1.6 | — | 15 | 12 | 178 | 1.5 |
| 15 | 1.6 | — | 15 | 12 | 44 | 0.2 |
| 16 | 1.6 | — | 15 | 12 | 46 | 12.0 |
| 17 | 1.0 | 20 | 15 | 10 | 50 | upper layer 0.0 lower layer 8.0 |
| 18 | 1.5 | 65 | 15 | 15 | 210 | 3.5 |
| 19 | 1.7 | — | 15 | 15 | 110 | Ny |
| 20 | 1.5 | — | 15 | 10 | 55 | PP |

*Ny: Nylon, PP: Polypropylene

Contrarily, the test results of comparison were as follows.

Test No. 12: Because of insufficient tin coating weight, splash occurred, which made high-speed welding impossible, and the weldability poor.

TABLE 1(B)

| Test No. | Weldability (splash) | Heat sealable property | Shrink characteristics (%) | Adhesive property after forming | Adhisive property after retorting |
|---|---|---|---|---|---|
| Example of present | | | | | |

TABLE 1(B)-continued

| Test No. | Weldability (splash) | Heat sealable property | Shrink characteristics (%) | Adhesive property after forming | Adhisive property after retorting |
|---|---|---|---|---|---|
| invention | | | | | |
| 1 | No | O | 1.5 | O | O |
| 2 | No | O | 0.5 | O | O |
| 3 | No | O | 0.2 | O | O |
| 4 | No | O | 1.0 | O | O |
| 5 | No | O | 2.2 | O | O |
| 6 | No | O | 0.2 | O | O |
| 7 | No | O | 1.2 | O | O |
| 8 | No | O | 0.4 | O | O |
| 9 | No | O | 1.3 | O | O |
| 10 | No | O | 2.0 | O | O |
| 11 | No | O | 0.1 | O | O |
| Comparison | | | | | |
| 12 | No | O | 0.5 | O | O |
| 13 | No | O | 0.4 | X | X |
| 14 | No | Δ | 0.5 | Δ | Δ |
| 15 | No | X | 0.1 | X | X |
| 16 | No | O | 5.0 | O | X |
| 17 | No | X | 1.5 | X | X |
| 18 | No | O | 0.5 | Δ | X |
| 19 | No | O | 5.5 | Δ | X |
| 20 | No | O | 4.5 | Δ | Δ |

EXAMPLE 2

The plated steel sheet used in Example 1 was pretreated in the same manner, and then preheated to 180°–230° C. Corona discharge treatment was performed on the film surface in contact with the plating surface. After that, an adhesive of about 30 mg/dm$^2$ (dry weight) was applied. After resin film was bonded continuously while being pressed by a roll, postheating was performed to obtain a laminated steel sheet. On the obtained laminated steel sheet, weldability, shrink characteristics of laminate film, adhesive property after forming, adhesive property after retorting, and resistance to whitening were investigated.

In laminating, a polyethylene terephthalate resin film of 161 mm wide and 10–50 μm thick was continuously pressed while installing an area where the resin film is not laminated. A pressing roll was made of silicone rubber and its surface temperature was kept at 195° C. Immediately after pressing, the temperature of steel sheet was kept at 205°–225° C. for 5–30 seconds for postheating, and then water cooled immediately.

The tests and evaluation on weldability, shrink characteristics, adhesive property after forming, and adhesive property after retorting were performed in the same manner as in Example 1. Concerning the resistance to whitening, the retort treatment was performed by immersing the test piece in 1.5% NaCl water solution at 125° C. for 30 minutes to observe the degree of whitening. In the test result, no whitening was marked with O, slight whitening with Δ, and obvious whitening with X.

The investigation of the characteristics was also performed on comparison examples which are out of scope of the present invention to compare with the examples of the present invention.

The detailed conditions of test piece used for the investigation and the test results are given in Table 2(A) and Table 2(B), respectively.

In the examples of test No. 1 through 9, satisfactory results were obtained in all tests.

Contrarily, the test results of comparison were as follows.

Test No. 10: Because of insufficient tin coating weight, splash occurred, which made high-speed welding impossible, the weldability was poor.

Test No. 11: Because of small amount of metallic chromium in chemical treatment, adhesive properties after working and retorting were low.

Test No. 12: Because of low molecular weight of epoxy resin in the adhesive and remaining uncured component, adhesive properties after working and retorting were low, and the resistance to whitening was poor.

Test No. 13: Because of high molecular weight of epoxy resin in the adhesive, adhesive property after working and retorting were low.

Test No. 14: Because of low content of epoxy resin in the adhesive, adhesive properties after working and retorting were low.

Test No. 15: Because of high content of epoxy resin in the adhesive and insufficient curing caused by the heating time of 30 seconds, adhesive property after retorting was low, and the resistance to whitening was poor.

As described above, the laminated steel sheet of present invention has a biaxially oriented resin film of polyethylene terephthalate base, which has high workability and a great shut-off effect, is laminated on the surface of plated steel sheet, which has excellent weldability, corrosion resistance, and adhesion of resin film, except for the area where resin film is not laminated. Polyethylene terephthalate having very small thermal shrinkage had a problem in terms of heat sealable property. According to present invention, this problem was solved by using a copolymer containing isophthalic acid to the extent that the thermal adhesive shrinkage is not impaired, or by using a two-layer resin film with the copolymer being the lower layer, or by using an adhesive which has high adhesion as well as high heat resistance, workability, and short-curing-time property. Therefore, this laminated steel sheet keeps high adhesion through the processes of working and heating during can making, and has high resistance in retorting in which the laminated steel sheet is exposed to severe environment. The present invention has a great effect on the streamlining of the can making process and the products providing such high quality material for cans.

TABLE 2(A)

| Test No. | Coating weight | | Chemical treatment layer | | Epoxy resin in adhesive | | Resin film |
|---|---|---|---|---|---|---|---|
| | Tin | Nickel | Hydrated chromium oxide | Metallic Cr | Number average molecular weight | Content (%) | |
| Example of present invention | | | | | | | |
| 1 | 1.2 | — | 12 | 13 | 20000 | 80 | PET |

TABLE 2(A)-continued

| Test No. | Coating weight Tin | Coating weight Nickel | Chemical treatment layer Hydrated chromium oxide | Chemical treatment layer Metallic Cr | Epoxy resin in adhesive Number average molecular weight | Epoxy resin in adhesive Content (%) | Resin film |
|---|---|---|---|---|---|---|---|
| 2 | 1.5 | — | 14 | 15 | 21000 | 85 | PET |
| 3 | 2.0 | — | 11 | 22 | 30000 | 70 | PET |
| 4 | 1.3 | — | 25 | 50 | 15000 | 80 | PET |
| 5 | 0.9 | — | 5 | 5 | 22500 | 90 | PET |
| 6 | 0.6 | 15 | 13 | 13 | 18500 | 75 | PET |
| 7 | 1.3 | 90 | 5 | 5 | 15000 | 80 | PET |
| 8 | 2.4 | 43 | 10 | 21 | 21500 | 90 | PET |
| 9 | 1.8 | 25 | 9 | 11 | 30000 | 80 | PET |
| Comparison | | | | | | | |
| 10 | 0.7 | — | 15 | 12 | 19000 | 75 | PET |
| 11 | 1.6 | — | 12 | 3 | 17000 | 75 | PET |
| 12 | 1.3 | — | 15 | 12 | 12000 | 80 | PET |
| 13 | 1.4 | — | 17 | 13 | 39000 | 75 | PET |
| 14 | 1.3 | — | 13 | 12 | 22000 | 50 | PET |
| 15 | 1.3 | — | 15 | 11 | 19000 | 95 | |

Note:
PET: polyethylene terephthalate

PETI: polyethylene terephthalate copolymer containing isophthalic acid

TABLE 2(B)

| Test No. | Weldability (splash) | Shrink characteristics | Adhesive property after forming | Adhesive property after retorting | Resistance to whitening |
|---|---|---|---|---|---|
| Example of present invention | | | | | |
| 1 | No | <0.1 | O | O | O |
| 2 | No | <0.1 | O | O | O |
| 3 | No | <0.1 | O | O | O |
| 4 | No | <0.1 | O | O | O |
| 5 | No | <0.1 | O | O | O |
| 6 | No | <0.1 | O | O | O |
| 7 | No | <0.1 | O | O | O |
| 8 | No | <0.1 | O | O | O |
| 9 | No | <0.1 | O | O | O |
| Comparison | | | | | |
| 10 | Yes | <0.1 | O | O | O |
| 11 | No | <0.1 | X | X | O |
| 12 | No | 0.1 | Δ | Δ | X |
| 13 | No | <0.1 | Δ | X | O |
| 14 | No | 0.1 | X | X | O |
| 15 | No | <0.1 | O | Δ | X |

What is claimed is:

1. A laminated steel sheet for a welded can comprising:
  a steel sheet;
  a plating layer formed on the steel sheet, said plating layer having a top surface with a roughness represented by a PPI of 5 to 150, wherein the PPI is the number of peaks per inch exceeding 0.5 μm appearing in the top surface of said plating layer as seen in a cross-section of the plating layer;
  said plating layer having a tinning layer and a chemical treatment layer; said tinning layer being formed on the steel sheet and said chemical treatment layer being formed on the tinning layer;
  said tinning layer having a coating weight of 0.9 g/m² to 2.8 g/m²;
  said chemical treatment layer containing 5 mg/m² to 50 mg/m² of metallic chromium and hydrated chromium oxide containing 5 mg/m² to 25 mg/m² of chromium; and
  a resin film bonded by thermo-compression on the plating layer in a band form;
  said resin film being a biaxially oriented film of a polyethylene terephthalate copolymer, said polyethylene terephthalate copolymer having an acid component of which 0.5 mol % to 10 mol % is isophthalic acid.

2. The laminated steel sheet of claim 1, wherein said surface roughness PPI of said plated layer is 5 to 100.

3. The laminated steel sheet of claim 1, wherein said polyethylene terephthalate copolymer has an acid component of which 1 mol % to 8 mol % is isophthalic acid.

4. The laminated steel sheet of claim 1, wherein the PPI is 5 to 100 and the isophthalic acid is in an amount of 1 to 8 mol %.

5. A laminated steel sheet for a welded can comprising:
  a steel sheet;
  a plating layer formed on the steel sheet, said plating layer having a top surface with a roughness represented by a PPI of 5 to 150, wherein the PPI is the number of peaks per inch exceeding 0.5 μm appearing in the top surface of said plating layer as seen in a cross-section of the plating layer;
  said plating layer having a tinning layer and a chemical treatment layer, said tinning layer being formed on the steel sheet and said chemical treatment layer being formed on the tinning layer;
  said tinning layer having a coating weight of 0.9 g/m² to 2.8 g/m²;
  said chemically treated layer containing 5 mg/m² to 50 mg/m² of metallic chromium and hydrated chromium oxide containing 5 mg/m² to 25 mg/m² of chromium; and
  a resin film bonded by thermo-compression on the plating layer in a band form, said resin film comprising a lower layer film and an upper layer film;
  said lower layer film being a biaxially oriented film of polyethylene terephthalate copolymer, said polyethylene terephthalate copolymer having an acid component of which 0.5 mol % to 10 mol % is isophthalic acid; and said upper layer film being a biaxially oriented film of polyethylene terephthalate.

6. The laminated steel sheet of claim 5, wherein said surface roughness PPI of said plated film is 5 to 100.

7. The laminated steel sheet of claim 5, wherein said polyethylene terephthalate copolymer has an acid component of which 1 mol % to 8 mol % is isophthalic acid.

8. The laminated steel sheet of claim 5, wherein the PPI is 5 to 100 and the isophthalic acid is in an amount of 1 to 8 mol %.

9. A laminated steel sheet for a welded can, comprising:

a steel sheet;

a plating layer formed on the steel sheet;

said plating layer having a tinning layer and a chemical treatment layer, said tinning layer being formed on the steel sheet and said chemical treatment layer being formed on the tinning layer;

said tinning layer having a coating weight of 0.9 g/m$^2$ to 2.8 g/m$^2$;

said chemical treatment layer containing 5 mg/m$^2$ to 50 mg/m$^2$ of metallic chromium and hydrated chromium oxide containing 5 mg/m$^2$ to 25 mg/m$^2$ of chromium;

an adhesive layer formed on the plating layer in a band form;

said adhesive layer being formed by heating and curing an adhesive including a resol type phenolic resin containing 70–90 wt. % bisphenol A epoxy resin and the balance being bisphenol A resin, the bisphenol A epoxy resin having a number average molecular weight of 15,000–30,000; and a resin film bonded on the plating layer by said adhesive layer;

said resin film being a biaxially oriented film of polyethylene terephthalate homopolymer.

10. The laminated steel sheet of claim 9, wherein said adhesive layer has a coating weight of 2–50 mg/dm$^2$.

11. The laminated steel sheet of claim 9, wherein said resin film includes a biaxially oriented film of polyethylene terephthalate copolymer.

12. A laminated steel sheet for welded can, comprising:

a steel sheet;

a plating layer formed on the steel sheet, said plating layer having a top surface with a roughness represented by a PPI of 5 to 150, wherein the PPI is the number of peaks per inch exceeding 0.5 μm appearing in the top surface of said plating layer as seen in a cross-section of the plating layer;

said plating layer having a lower nickel plating layer, an upper tinning layer and a chemical treatment layer, said nickel plating layer being formed on the steel sheet, said tinning layer being formed on the nickel plating layer, and said chemical treatment layer being formed on the tinning layer;

said nickel plating layer having a coating weight of 15 g/m$^2$ to 100 g/m$^2$;

said tinning layer having a coating weight of 0.6 g/m$^2$ to 2.0 g/m$^2$;

said chemical treatment layer containing 5 mg/m$^2$ to 50 mg/m$^2$ of metallic chromium and hydrated chromium oxide containing 5 mg/m$^2$ to 25 mg/m$^2$ of chromium; and a resin film bonded by thermo-Compression on the plating layer in a band form;

said resin film being a biaxially oriented film of a polyethylene terephthalate copolymer, said polyethylene terephthalate copolymer having an acid component of which 0.5 mol % or more and 10 mol % or less is isophthalic acid.

13. The laminated steel sheet of claim 12, wherein said surface roughness PPI of said plating layer is 5 to 100.

14. The laminated steel sheet of claim 12 wherein said polyethylene terephthalate copolymer has an acid component of which 1 mol % to 8 mol % is isophthalic acid.

15. A laminated steel sheet for a welded can, comprising:

a steel sheet;

a plating layer formed on the steel sheet, said plating layer having a top surface with a roughness represented by a PPI of 5 to 150, wherein the PPI is the number of peaks per inch exceeding 0.5 μm appearing in the top surface of said plating layer as seen in a cross-section of the plating layer;

said plating layer having a lower nickel plating layer, an upper tinning layer and a chemical treatment layer, said nickel plating layer being formed on the steel sheet, said tinning layer being formed on the nickel plating layer, and said chemical treatment layer being formed on the tinning layer;

said nickel plating layer having a coating weight of 15 g/m$^2$ to 100 g/m$^2$;

said tinning layer having a coating weight of 0.6 g/m$^2$ to 2.0 g/m$^2$;

said chemical treatment layer containing 5 mg/m$^2$ to 50 mg/m$^2$ of metallic chromium and hydrated chromium oxide containing 5 g/m$^2$ to 25 mg/m$^2$ of chromium;

a resin film bonded by thermo-compression on the plating layer in a band form, said resin film comprising a lower layer film and an upper layer film;

said lower layer film being a biaxially oriented film of a polyethylene terephthalate copolymer, said polyethylene terephthalate copolymer having an acid component of which 0.5 mol % to 10 mol % is isophthalic acid; and said upper layer film being a biaxially oriented film of polyethylene terephthalate.

16. The laminated steel sheet of claim 15 wherein said surface roughness PPI of said plating layer is 5 to 100.

17. The laminated steel sheet of claim 15 wherein said polyethylene terephthalate copolymer has an acid component of which 1 mol % to 8 mol % is isophthalic acid.

18. A laminated steel sheet for a welded can, comprising:

a steel sheet;

a plating layer formed on the steel sheet, said plating layer having a lower nickel plating layer, an upper tinning layer and a chemical treatment layer, said nickel plating layer being formed on the steel sheet, said tinning layer being formed on the nickel plating layer and said chemical treatment layer being formed on the tinning layer;

said nickel plating layer having a coating weight of 15 g/m$^2$ to 100 g/m$^2$;

said tinning layer having a coating weight of 0.6 g/m$^2$ to 2.0 g/m$^2$;

said chemical treatment layer containing 5 mg/m$^2$ to 50 mg/m$^2$ of metallic chromium and hydrated chromium oxide containing 5 mg/m$^2$ to 25 mg/m$^2$ of chromium;

an adhesive layer formed on the plating layer in a band form;

said adhesive layer being formed by heating and curing an adhesive including a resol type phenolic resin containing 70–90 wt. % bisphenol A epoxy resin and the balance being bisphenol A resin, the bisphenol A epoxy resin having a number average molecular weight of 15,000–30,000; and a resin film bonded on the plating layer by said adhesive layer, said resin film being a biaxially oriented film of polyethylene terephthalate homopolymer.

19. The laminated steel sheet of claim 18 wherein said adhesive layer has a coating weight of 2–50 mg/dm$^2$.

20. The laminated steel sheet of claim 18 wherein said resin film includes a biaxially oriented film of polyethylene terephthalate copolymer.

* * * * *